United States Patent [19]
Heller et al.

[11] 4,084,044
[45] Apr. 11, 1978

[54] LIQUID-SEMICONDUCTOR PHOTOCELL USING SINTERED ELECTRODE

[75] Inventors: Adam Heller, Bridgewater; Barry Miller, Murray Hill; Murray Robbins, Berkeley Heights, all of N.J.

[73] Assignee: Bell Telephone Laboratories, Incorporated, Murray Hill, N.J.

[21] Appl. No.: 769,949

[22] Filed: Feb. 18, 1977

[51] Int. Cl.$^2$ .................................. H01M 6/30
[52] U.S. Cl. .................. 429/111; 29/623.1; 29/572
[58] Field of Search .............. 429/111; 29/572, 623.1; 250/211 J

[56] References Cited

U.S. PATENT DOCUMENTS 4,011,149  3/1977  Nozik .................................. 204/129

OTHER PUBLICATIONS

H. Tsubomura et al. "Dye Sensitized Zinc Oxide: Aqueous Electrolyte: Platinum Photocell", Nature, vol. 261, pp. 402–403 (1976).

H. Genscher "Electrochemical Photo & Solar Cells - Principles and Some Experiments", Electroen. Chem. & Interfacial Electrochem, vol. 58, pp. 263–274 (1975).

A. B. Ellis et al., "Visible Light to Electrical Energy Conversion Stable CdS and CdSe Photoelectrodes in Aqueous Electrolytes," J. Am. Chem. Soc., vol. 98, pp. 1635–1637 (1976).

G. Hodes et al., "Photoelectrical Energy Conversion & Storage Using Polycrystalline Chalcogenide Electrodes", Nature, vol. 261, pp. 403–404 (1976).

Primary Examiner—Aaron Weisstuch
Attorney, Agent, or Firm—Richard D. Laumann

[57] ABSTRACT

Liquid-semiconductor photocells have received attention recently for use in solar power devices. Alternatives to single crystal semiconductors have been sought to reduce the cost of the photocells. According to this invention, the semiconductor is made from a pressure sintered and vapor annealed semiconductor. The electrode is relatively inexpensive to make and the efficiency of the solar cell compares favorably to the efficiency of solar cells using single crystal electrodes.

5 Claims, 3 Drawing Figures

LIQUID-SEMICONDUCTOR PHOTOCELL USING SINTERED ELECTRODE

BACKGROUND OF THE INVENTION

1. Field of the Invention

This invention relates generally to large area semiconductor junction devices for use as photocells and in particular to such devices for use as solar cells.

2. Description of the Prior Art

Concern over the continued availability of fossil fuel energy sources has generated interest in the development of other energy sources including solar power which can be used to generate electricity. The devices most often considered for conversion of solar power into electricity are semiconductor devices, commonly called solar cells, which collect light, and generate photocurrent, in proportion to the area of the photosensitive junction which must be large to generate a useful current. The cost of manufacturing such devices depends mainly on the area of the photosensitive junction and is presently too high to permit commercial exploitation of solar cells for other than limited and specialized applications.

Considerable effort has been devoted to finding ways to reduce the cost of semiconductor solar cell devices. Much of this effort has been directed, as in U.S. Pat. No. 3,953,876 issued Apr. 27, 1976, to devices in which the semiconductor material is deposited as a polycrystalline thin film on an inexpensive substrate rather than grown by the costly single crystal techniques used in early solar cells. A different approach that has generated enthusiasm recently is the liquid semiconductor junction solar cells. The active part of these cells is a junction formed at a semiconductor-liquid interface. Because the junction forms spontaneously at the liquid-solid interface, the device promises to be less costly to manufacture as relatively costly epitaxy or diffusion procedures, required for the single crystal or polycrystalline devices mentioned, are not needed to form the junction.

Two obstacles still remain and must be surmounted before such cells can be exploited commercially. First, liquid-semiconductor junctions are often not photochemically stable because photoexcitation produces holes at the semiconductor surface which may react with the redox electrolyte and corrode the semiconductor surface in a manner that degrades the desired characteristics of the semiconductor surface as manifested by decay of the photocurrent from the cell with operating time. An example of such a reaction with a CdS electrode is $CdS + 2h^+ \rightarrow S^0 + Cd^{2+}$ leading to the formation of a sulfur layer at the junction interface. One approach to this problem involves the use of a polysulfide-sulfide redox couple solution. Since the corrosion reaction $CdS + 2h^+ \rightarrow Cd^{++} + S$ proceeds at a higher electrode potential than the reaction $S^= \rightarrow S + 2e$, the sulfur-polysulfide couple consumes the holes responsible for the corrosion reaction before the potential for the corrosion reaction is reached.

Second, the cost of single crystal semiconductor electrodes is too high for commercial success. Several approaches have been tried to reduce the cost of the single crystal semiconductor, especially chalcogenide, electrode. One involves the electrolytic codeposition of the electrode materials, e.g., cadmium and selenium, on an inert substrate. Another involves the anodization of a cadmium or bismuth substrate to form a chalcogenide semiconductor.

SUMMARY OF THE INVENTION

We have discovered that the semiconductor element for a liquid-semiconductor junction photocell can be produced by sintering powdered semiconductor material under controlled temperature and pressure and then vapor annealing the sintered material at controlled temperature. Chalcogenide semiconductors appear especially suited to the invention and a CdSe electrode produced in this way is both inexpensive to produce and relatively efficient as compared to single crystal CdSe electrodes.

DETAILED DESCRIPTION

Figure 1:
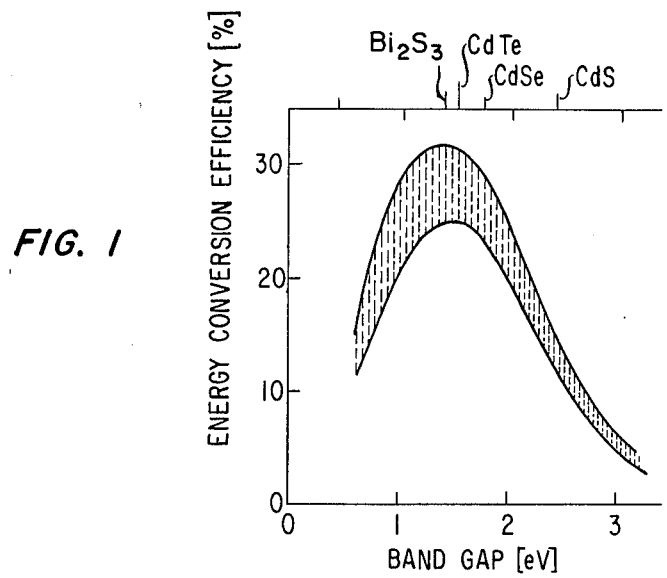
FIG. 1 is a plot of the theoretical energy conversion efficiency for several semiconductor materials as a function of bandgap taking the solar spectrum into account.

FIG. 1 shows an idealized plot of energy conversion efficiency for several semiconductor materials versus semiconductor bandgap taking the solar spectrum into account. The range of efficiencies for each bandgap value results from different atmospheric conditions and assumptions about losses in cell voltage. As can be seen, CdSe, CdTe, CdS and $Bi_2S_3$ have bandgaps that permit approximately the maximum energy conversion efficiency theoretically possible.

Figure 2:
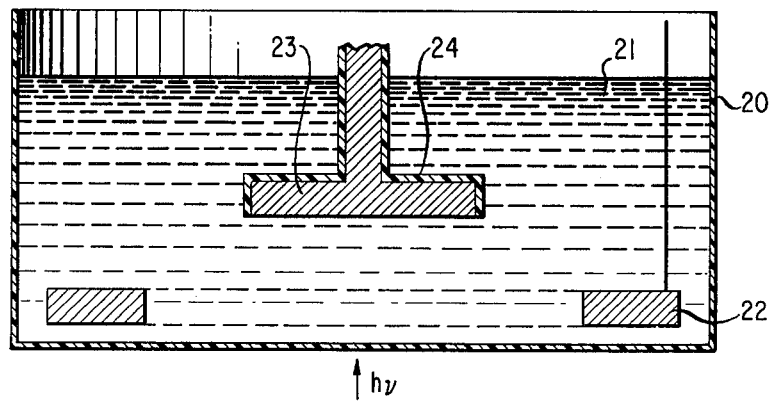
FIG. 2 is a schematic representation of a liquid-semiconductor photocell.

The cell structure of FIG. 2 comprises a container 20, electrolyte 21, counter electrode 22, which in our devices is carbon, although other inert materials may be used, and the active electrode 23. Electrode 23 is insulated as with epoxy 24 except where activated and illuminated. The container may be made of any conveniently available glass or plastic material. An aqueous electrolyte is preferred because of the better conductivity it affords although nonaqueous electrolytes may also be used. The bottom of the cell is transparent to pass incident light as shown. Photocells as just described were made with various sintered and vapor-annealed semiconductors as the active electrode 24.

Semiconductor powder of high purity, e.g., typically of 99.999% or greater purity and having particle sizes ranging from 1 to 100 microns is sintered at a temperature in the range from 600° to 1100° C under a pressure in the range from 4000 psi to 10,000 psi. The resulting disks are sliced and vapor annealed in evacuated quartz tubes over metal vapor, for 1 to 120 hours and with a temperature between 500° and 800° C, until stoichiometry is restored and the desired carrier concentration is reached. The preferred dopant for the Cd chalcogenides is Cd and for the Bi chalcogenides is Bi. The desired dopant concentration is less than $5 \times 10^{18}/cm^3$ because above this value the space charge layer is too thin to permit light absorption only within the space charge layer. Electrical contacts such as indium and silver epoxy are then made to the disks with conventional techniques.

The above temperature and pressure ranges have been found to be not very critical. The temperature and pressure ranges mentioned are sufficiently high to cause the growth of grains larger than the 1 microns grains desired. Upon heating to temperatures necessary to achieve grain growth, the material does, however, lose its stoichiometry through the loss of material, for example, from a chalcogenide, Cd and is not suitable for electrode use at this time because it is highly resistive and possesses the wrong doping level. It is not known with any precision why the material possesses these undesirable properties prior to metal vapor annealing. Possible causes may be crystal imperfections associated with the lack of stoichiometry or phase transitions caused by the high temperatures and pressures used. The annealing step restores the proper amount of material, e.g., Cd or Bi and makes the material a properly doped n-type semiconductor. If they are previously present, the annealing also reduces the number of crystal imperfections and restores the material to the desired phase. As such, annealing is a critical step and is carried out in the presence of metal vapor at a temperature between 500° and 700° C for a time period between 1 hour and 140 hours. Within these ranges the intervals between 550° and 600° C and between 10 hours and 100 hours have been found to give best results for Cd vapor annealing.

High efficiencies will be obtained in solar cells using polycrystalline materials only if the grain size is sufficiently large to absorb practically all incident light in the top layer of grains exposed to the electrolyte. Additionally, all efficient photovoltaic devices require that the space charge layer thickness should be less than the light absorption depth, and traps due to lattice mismatch or dislocations at or near the absorbing junction must be eliminated or minimized in number.

The absorption length must be less than the grain size because light absorbed beyond the first layer of grains does not effectively add to the photocurrent as minority carriers are efficiently trapped at the grain boundaries. The absorption lengths for contemplated materials including CdSe, CdTe, CdS, and $Bi_2S_3$ are approximately $10^{-4}-10^{-5}$ cm and grain sizes of $1\mu$ are adequate. The large size of the grains produced by the sintering, typically $10\mu$ or larger, compared to the absorption length accounts for the relatively great latitude allowed for the temperatures and pressures used in the sintering process.

The thickness of the space charge layer must be less than the absorption length to insure prompt separation of the carriers and reduce the probability of their recombination. As is known, the thickness, S, of the space charge layer is given by recombination of carriers which reduces cell efficiency. The problem of lattice mismatch is inherently lacking at liquid-solid interfaces and if the grains are virtual single crystals, etching can remove surface defects at the upper layer. It is desirable that the electrode be etched as in a 3:1 to 4:1 mixture of HCl and $HNO_3$, to remove surface defects. It has been found that polysulfide-sulfide, polytelluride-telluride, and polyselenide-selenide redox electrolytes permit operation of the cells over extended time periods with minimal photocorrosion of the electrode. The maximum electrolyte concentration is determined by the maximum amount that they may be dissolved in the solute. The minimum concentration is determined by the need of the electrolyte to carry a useful amount of photocurrent and still prevent excessive photoetching and is approximately 0.1 molar for the mentioned redox couples in an aqueous solution.

Figure 3:
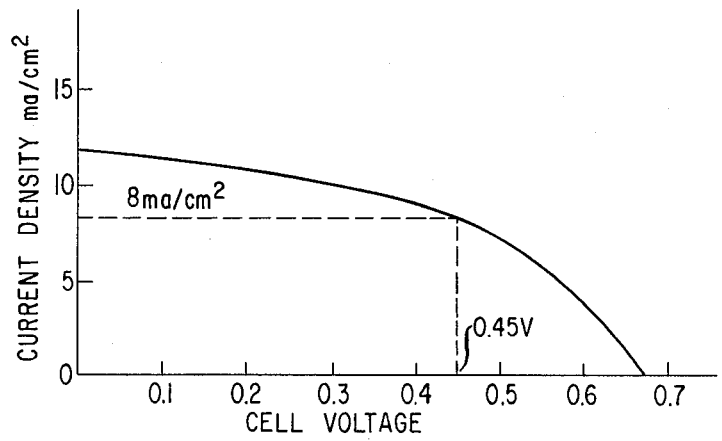
FIG. 3 is a plot of photocurrent vs. voltage for a CdSe liquid photocell made according to this invention.

The current-voltage characteristic curve for a cell with a polysulfide-sulfide redox electrolyte, a nominal 1 molar total sulfide concentration and a CdSe electrode is shown in FIG. 3. The illumination used was sunlight equivalent to noon time winter illumination on middle latitudes—air mass two (AM2). The efficiency of the cell is 5.1% or about 68% of the value obtained with a single crystal electrode.

EXAMPLES

CdTe powder of 99.999% purity and 5–10 $\mu$m particle size was pressed at 650° C and at 10,000 psi for two hours. The resulting pellet was composed of grains between 20 $\mu$m and 30 $\mu$m diameter. The pellet was annealed in a sealed tube containing Cd vapor at 600° C for 100 hours. The resulting pellet was used in a photocell having a nominal 1 molar total selenium concentration. $H_2Se$ was dissolved in a basic solution such as KOH to obtain the electrolyte. Other bases could be used. The short circuit current density of this cell, under illumination by a 100 watt tungsten halogen lamp was 13.3 ma/cm² and its open circuit voltage was 0.77 volts. A solar cell made with a single n-type CdTe crystal, in the same solution and under similar illumination, had a short circuit current density of 45.8 ma/cm² and an open circuit voltage of 0.76 volts.

CdSe electrodes were prepared from CdSe material of greater than 99.999% purity and 5–10 $\mu$m particle size as shown in Table 1. The cells were run under a light flux approximating AM2 conditions with approximately a 1 mole sulfide/polysulfide redox electrolyte and a carbon counterelectrode. The short circuit current and conversion efficiency are given with respect to values obtained with a single CdSe crystal.

Table 1

| Method of Preparation | | | Method of Cd Anneal | | Grain Size, Micron | Relative Short Circuit Current | Relative Conversion Efficiency | Open Circuit Voltage | Fill Factor |
|---|---|---|---|---|---|---|---|---|---|
| T° C | P,kpsi | t,hrs | T° C | t,hrs | | | | | |
| 925 | 10 | 2 | 600 | 16 | 10–20 | 0.70 | 0.69 | 0.730 | 0.58 |
| 940 | 10 | 2 | 600 | 16 | 10–20 | 0.68 | 0.60 | 0.728 | 0.56 |
| 1100 | 4 | 1 | 600 | 17 | 10–20 | 0.55 | 0.48 | 0.710 | 0.52 |
| 940 | 10 | 2 | 700 | 112 | 10–20 | 0.68 | 0.70 | 0.755 | 0.49 |

$$S = \left(\frac{2\epsilon\epsilon_o\Delta\psi_{sc}}{qN_D}\right)^{\frac{1}{2}}$$

where $\epsilon$ is the static dielectric constant of the semiconductor material, $\epsilon_o$ is the permittivity of free space, $\Delta\psi_{sc}$ is the voltage drop across the space charge layer, $q$ is the electron charge and $N_D$ is the donor concentration.

Traps due to lattice mismatch or dislocations at or near the junction are undesirable because they cause

What is claimed is:

1. A photocell containing a photovoltaic junction beteen a semiconductor material and a liquid electrolyte containing a redox couple CHARACTERIZED IN THAT said photoactive electrode comprises a sintered and metal vapor annealed semiconductor, said semiconductor being formed from a powdered chalcogenide selected from the group consisting of cadmium selenide, cadmium telluride, cadmium sulfide and bismuth sulfide and mixtures thereof, and said metal is selected from the group consisting of cadmium and bismuth.

2. The photocell recited in claim 1 in which said electrolyte containing the redox couple is a solution comprising anions selected from the group consisting of sulfide, selenide, telluride and mixtures thereof.

3. A method for making a photocell comprising:
forming a chalcogenide semiconductor electrode, said chalcogenide being selected from the group consisting of powdered cadmium selenide, cadmium sulfide, cadmium telluride and bismuth sulfide; and
immersing said electrode and a counter electrode in a cell containing a redox electrolyte comprising anions selected from the group consisting of sulfide, selenide, telluride and mixtures thereof; CHARACTERIZED IN THAT said forming step comprises: sintering and metal vapor annealing said chalcogenide semiconductor, said metal being selected from the group consisting of cadmium and bismuth.

4. A method as recited in claim 3 in which said sintering step uses a pressure between 400psi and 10,000psi and a temperature between 600° and 1100° C.

5. A method as recited in claim 4 in which said metal vapor annealing step comprises heating said chalcogenide to a temperature between 500° and 800° C and exposing said chalcogenide to said metal vapor.

* * * * *